United States Patent
Simpson

(10) Patent No.: US 6,722,442 B2
(45) Date of Patent: Apr. 20, 2004

(54) SUBSURFACE APPARATUS

(75) Inventor: Neil Andrew Abercrombie Simpson, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/990,026

(22) Filed: Nov. 21, 2001

(65) Prior Publication Data

US 2002/0079107 A1 Jun. 27, 2002

Related U.S. Application Data

(63) Continuation-in-part of application No. 09/242,423, filed on Feb. 16, 1999, now Pat. No. 6,460,616, and a continuation-in-part of application No. PCT/GB00/02053, filed on May 26, 2000.

(51) Int. Cl.[7] .............................. E21B 4/04
(52) U.S. Cl. ............. 166/381; 166/66.4; 166/173; 175/99
(58) Field of Search ................ 166/104, 66.4, 166/177.3, 173, 65.1, 243, 381, 311; 175/98, 99

(56) References Cited

U.S. PATENT DOCUMENTS

| | | | |
|---|---|---|---|
| 2,518,330 A | 8/1950 | Jasper et al. | 175/377 |
| 3,047,270 A | 7/1962 | Moore, Jr. | 254/134.6 |
| 3,144,240 A | 8/1964 | Connell | 254/134.5 |
| 3,395,759 A | 8/1968 | Talley, Jr. | 166/155 |
| 4,007,784 A | 2/1977 | Watson et al. | 166/170 |
| 4,031,750 A | 6/1977 | Youmans et al. | 73/151 |
| 4,071,086 A | 1/1978 | Bennett | 166/177 |
| 4,192,380 A | 3/1980 | Smith | 166/250 |
| 4,389,208 A | 6/1983 | LeVeen et al. | 604/95 |
| 4,457,236 A | 7/1984 | Akhmadiev et al. | 104/138 G |

(List continued on next page.)

FOREIGN PATENT DOCUMENTS

| | | | |
|---|---|---|---|
| DE | 24 05 343 | 8/1975 | B63H/1/32 |
| DE | 33 11 094 | 9/1984 | B65G/35/00 |
| DE | 93 11 145.2 | 1/1995 | F16L/5/02 |
| EP | 0 390 352 | 10/1990 | G21C/17/017 |
| EP | 0 514 039 | 11/1992 | F16L/55/26 |
| EP | 0 523 880 | 1/1993 | F17D/5/02 |
| EP | 0 526 900 | 2/1993 | F16L/55/26 |
| FR | 2 355 236 | 1/1978 | F16L/55/00 |
| FR | 2 495 191 | 6/1982 | C23F/13/00 |
| GB | 614 592 | 12/1948 | |

(List continued on next page.)

OTHER PUBLICATIONS

Bloom et al., US 2002/0104686 A1, (Aug. 2002).*

International Search Report from the European Patent Office for International Appl. No. PCT/GB00/01360, dated Jul. 28, 2000.

International Search Report from the European Patent Office for International Appl. No. PCT/GB01/05150, dated Feb. 20, 2002.

PCT International Search Report from PCT/GB 00/02053, Dated Aug. 22, 2000.

*Primary Examiner*—Zakiya Walker
(74) *Attorney, Agent, or Firm*—Moser, Patterson & Sheridan, L.L.P.

(57) ABSTRACT

A subsurface apparatus in the form a tractor is adapted for travel through a bore containing a moving fluid stream. The tractor comprises a body, a drive arrangement for moving the body in a desired direction, a member mounted on the body and adapted to be driven by the moving fluid, and a conversion arrangement for converting movement of the member to drive for the drive arrangement. The drive arrangement may include a contactless magnetic coupling and a harmonic drive.

44 Claims, 3 Drawing Sheets

U.S. PATENT DOCUMENTS

| | | |
|---|---|---|
| 4,460,920 A | 7/1984 | Weber et al. ............... 358/100 |
| 4,537,136 A | 8/1985 | Douglas ................. 104/138 G |
| 4,581,938 A | 4/1986 | Wentzell ..................... 73/623 |
| 4,648,454 A | 3/1987 | Yarnell ...................... 166/297 |
| 4,676,310 A | 6/1987 | Scherbatskoy et al. .... 166/65.1 |
| 4,919,223 A | 4/1990 | Egger et al. ................. 180/8.1 |
| 5,121,694 A | 6/1992 | Zollinger ................. 104/138.2 |
| 5,184,676 A | 2/1993 | Graham et al. ............ 166/66.4 |
| 5,309,844 A | 5/1994 | Zollinger ................. 104/138.2 |
| 5,625,917 A | 5/1997 | Hawkins ................ 15/104.061 |
| 5,794,703 A | 8/1998 | Newman et al. ............ 166/381 |
| 6,082,461 A | 7/2000 | Newman et al. ............ 166/381 |
| 6,089,323 A | 7/2000 | Newman et al. ............ 166/381 |
| 6,179,055 B1 | 1/2001 | Sallwasser et al. ...... 166/254.2 |
| 6,345,669 B1 * | 2/2002 | Buyers et al. .............. 166/381 |
| 6,431,270 B1 * | 8/2002 | Angle ....................... 166/66.5 |
| 6,454,011 B1 * | 9/2002 | Schempf et al. ............ 166/381 |

FOREIGN PATENT DOCUMENTS

| | | | |
|---|---|---|---|
| GB | 1 124 732 | 8/1968 | ............ B08B/9/02 |
| GB | 1 418 492 | 12/1975 | ........... B62D/57/02 |
| GB | 2 331 347 | 5/1999 | ........... B26D/57/00 |
| GB | 2 334 280 | 8/1999 | ........... E21B/23/14 |
| GB | 2 305 407 | 9/1999 | ........... B26D/57/02 |
| WO | WO 86/01751 | 3/1986 | ............ B08B/9/04 |
| WO | WO 93/24728 | 12/1993 | ........... E21B/17/10 |
| WO | WO 94/08728 | 4/1994 | ............ B05C/7/08 |
| WO | WO 98/06927 | 2/1998 | ........... E21B/23/14 |
| WO | WO 99/36724 | 7/1999 | ........... F16L/55/28 |
| WO | WO 00/57100 | 9/2000 | ........... F16L/55/40 |
| WO | WO 00/63606 | 10/2000 | ........... F16L/55/26 |
| WO | WO 01/18351 | 3/2001 | ........... E21B/37/02 |

* cited by examiner

SUBSURFACE APPARATUS

CROSS-REFERENCE TO RELATED APPLICATIONS

This application is a continuation-in-part application of U.S. patent application Ser. No. 09/242,423 filed Feb. 16, 1999, now U.S. Pat. No. 6,460,616 B1, and is a Continuation of International Application No. PCT/GB00/02053 filed May 26, 2000 with publication date of Dec. 7, 2000.

BACKGROUND OF THE INVENTION

SUMMARY OF THE INVENTION

This invention relates to apparatus intended for use in subsurface or other inaccessible locations, and in particular but not exclusively to such an apparatus having the ability to convert energy in fluid flowing in a subsurface conduit to energy which may be utilised by the apparatus. One aspect of the invention relates to a tractor.

In the oil and gas exploration and extraction industry, there is widespread use of subsurface and subsea conduits, often of extended length: for example, well bores may extend for several kilometers from wellheads to remote hydrocarbon-bearing formations, and subsea pipelines may extend for many kilometers between, for example, subsea wellheads and support platforms, and between production platforms and onshore facilities. Over time, there tends to be a build up of material on the inner walls of such pipelines, which material may include wax, scale and various precipitates. Of course such a build up of material will reduce the flow capacity of the pipeline, and may ultimately result in the pipeline becoming blocked. Conventionally, such pipelines are periodically cleaned by passing a "pig" through the pipeline, the pig being launched into the pipeline at an appropriate upstream point, which may require production to be temporarily stopped. A pig is typically of cylindrical form, of slightly smaller diameter than the pipeline, and is carried through the pipeline by the flow of fluid in the pipeline. Dislodged material therefore builds up in front of the pig, and thus it is not unusual for pigs to become stuck in pipelines, which may bring production to a halt. Retrieval of a stuck pig requires the pig to be located, the pipeline opened to remove the pig, and the pipeline reinstated. As these operations may have to be carried out subsea, retrieval of a stuck pig is an expensive and difficult undertaking.

It is among the objectives of embodiments of the present invention to obviate or mitigate these disadvantages. In particular, embodiments of the present invention relate to a tractor which may convert energy in fluid flowing in a pipeline to energy which may be utilised to drive the tractor in the opposite direction to the direction of fluid flow; the tractor may be utilised to transport a pipeline cleaning tool or device through a pipeline.

According to one aspect of the invention, there is provided a tractor adapted for travel through a moving fluid stream, the tractor comprising a body;

drive means for moving the body in a desired direction;

a rotatable member mounted on the body and adapted to be driven by moving fluid; and conversion means for converting movement of the member to drive for the drive means, said conversion means comprising a contactless coupling between the rotatable member and the drive means.

Such an arrangement enables the tractor to move in a moving fluid stream, and to obtain its motive power from the moving fluid. In preferred embodiments of the invention, this allows the tractor to operate without requiring a link to a remote power source, and without the tractor having to carry its own power supply. The tractor may be arranged to be driven in the same direction as the fluid, but is preferably arranged to be driven in the opposite direction to the fluid flow, that is upstream or against the flow.

Preferably, the member is adapted to be rotated by the flow of fluid past the body, and may be in the form of a turbine blade arrangement. The rotatable member preferably rotates around the body, and the axis of rotation of the rotatable member is preferably coaxial with the body.

Preferably, the conversion means is adjustable to vary the coupling between the rotatable member and the drive means. In one embodiment, the degree of coupling is variable and, for example, the maximum torque or force transferred between the rotatable member and the drive means may be varied, and in another embodiment the gearing between the rotatable member and the drive means may be varied. In other embodiments the degree of coupling between the rotatable member and drive means may be fixed, for example the conversion means may comprise a non-adjustable gear train.

Preferably, the conversion means comprises a magnetic induction coupling. This facilitates sealing the various elements of the tractor against ingress of fluid and other materials which may be present in the environment of the tractor, and may reduce friction losses normally incurred by sliding seals. In the preferred magnetic induction coupling, the spacing between the driving and driven elements of the coupling is variable, to vary the degree of coupling between the elements. Most preferably, the elements are relatively axially movable. Thus, by varying the axial spacing and thus the degree of coupling between the elements it may be possible to, for example, reduce the power or torque transferred from the rotatable member to the drive means and thus reduce the speed of the tractor. Alternatively, the conversion means may comprise a mechanical drive link, although for most applications this would require provision of sliding seals and the like.

The tractor may carry cutting means for removing or dislodging material surrounding or adjacent the body, for example deposits on the inner wall of a conduit through which the tractor is travelling. The cutting means may comprise a blade having radially or axially extending blades, and the blades may be rigidly mounted or in the form of flails. Alternatively, the cutting means may be in the form of fluid jets, or an ultrasonic emitter. In such embodiments, energy from the fluid driven member may be utilised to drive a pump or power an ultrasonic source.

The conversion means may be linked to a coupling control, which may control the degree of coupling between driving and driven elements of the coupling. The coupling control may comprise a rotating blade, and on the blade speed slowing, indicative of the tractor encountering a restriction or obstruction and the blade having to make a "heavy" cut, the degree of coupling may be reduced, to slow the rate of advance of the tractor. In other embodiments the coupling control may include a gauge sensor, such as a gauge ring.

Preferably, the conversion means comprises reduction gearing for converting a high speed low torque input from the rotatable member to a relatively low speed high torque output to the drive means. For example, the rotatable member may rotate at 2000 rpm, and this rotation may be stepped down at a ratio of 80:1, to 25 rpm. Preferably also, the conversion means comprises an output shaft which is substantially coaxial with an axis of rotation of the rotatable member. Most preferably, the conversion means comprises a harmonic drive. A typical harmonic drive comprises three main parts, (1) an outer rigid ring with internal teeth, (2) a non-rigid, thin cylindrical cup with external teeth on a slightly smaller pitch diameter than the outer ring, and the cup fitting over and being held in an elliptical shape by (3) an elliptical plug carrying a thin raced ball bearing. The cup is slightly smaller in diameter than the outer ring and usually had two fewer teeth than the ring. The elliptical shape of the plug causes the teeth of the cup to engage the ring at two opposite regions across the major axis of the ellipse. As the plug rotates, the zone where the teeth of the ring engage those of the cup travels with the major elliptical axis. For each 180° clockwise movement of the plug, the cup moves counterclockwise by one tooth relative to the outer ring. Thus, each complete clockwise rotation of the plug results in the cup moving counterclockwise by two teeth from its previous position relative to the outer ring.

In other embodiments, the conversion means may comprise an electric generator, such as a dynamo or alternator, and an electric motor coupled to the drive means. This arrangement offers the advantage that the torque output of the motor is relatively constant, irrespective of motor speed. There is also some flexibility in the relative locations of the generator and motor, as there is no requirement for a mechanical coupling therebetween. The conversion means may include a battery or other electrical energy storage arrangement, the battery being supplied with electrical energy by the generator. An advantage of this arrangement is that the battery may provide motive power for the tractor in the temporary absence of fluid flow.

The conversion means may comprise a hydraulic fluid pump and a hydraulic motor, or may comprise one or more of a combination of energy conversion and transmission arrangements, to suit the particular application of the tractor.

The drive means may take any suitable form, and may include wheels, legs, tracks, fluid impellers or the like. Most preferably, the tractor is adapted for use in conduits, and the drive means is in the form of a plurality of brush traction elements, such as described in U.S. Pat. No. 6,460,616 B1, the disclosure of which is incorporated herein by reference. The brush traction elements are oscillated or swashed backwards and forwards by cams mounted on a central drive shaft and derive traction from elastomer or otherwise resilient fingers which contact the inner wall of the conduit, which may be a pipe or a cased or uncased borehole. Altering the mounting position of the fingers with respect to the centre line of the bearings on which each brush traction element is mounted increases or decreases the amount of grip provided by the fingers by increasing or reducing the effective diameter of each traction element. A cyclic variation in the mounting position of a series of adjacent traction elements, and which allows the traction elements to drive the tractor, may be achieved by varying the angular offset of each traction element cam on the central drive shaft. For example, each cam may be mounted in the drive shaft to be 60°, 90°, 120° and 180° offset from an adjacent cam. Further, by moving the mounting position of the brush traction element from one side of a neutral centre line to the other it is possible to reverse the direction of traction. This is useful when it is desired to retrieve the tractor; by moving the mounting position the tractor may then be driven in the reverse direction, or where the tractor has been moving against the direction of flow the force produced on the tractor by the fluid may be sufficient to push or reverse the tractor. To facilitate such movement the tractor may further comprise a selectively actuatable fluid flow restriction adapted to interact with the flowing fluid to create a force on the tractor. The restriction may be in the form of a parachute or like arrangement, or radially extendable seals or the like.

The tractor may comprise a plurality of bodies, each provided with drive means, a member, and conversion means. Alternatively, individual tractor elements may be provided selectively on the bodies. The bodies may be coupled by any appropriate means, for example flexible cables, chains or universal joints, and where drive or other forces are to be transferred between bodies by, for example, constant velocity universal joints. The ability to form the tractor from a number of flexibly coupled or articulated bodies facilitates negotiation of tight bends, including 3D and 5D bends (that is tubes having a bend radius three or five time the tube radius) as often utilised in oil and gas exploration and production applications.

Preferably, the tractor includes an obstruction sensor operatively associated with one or both of the conversion means and the drive means and for reversing or uncoupling said means to permit the tractor to stop or move in an opposite direction. The sensor may comprise a probe at the leading end of the tractor for detecting solid obstructions, or detecting sharp turns in a tube in which the tractor is located; for example, the probe may be adapted to detect a 3D bend in a tube, that is a bend with a radius of three times the radius of the tube. Thus, the tractor may be adapted to travel through a tube until the tractor encounters a 3D bend at a known location, and on encountering the bend the tractor will reverse. Alternatively, the sensor may comprise a gauge ring or cutting blade.

The body preferably defines a housing accommodating the conversion means, and the housing is preferably pressure compensated.

According to another aspect of the invention there is provided a tractor adapted for travel through a moving fluid stream, the tractor comprising:

a body;

drive means for moving the body in a desired direction;

a rotatable member mounted on the body and adapted to be driven by moving fluid; and conversion means for converting rotation of the member to drive for the drive means, said conversion means comprising a harmonic drive.

In other aspects of the invention, one or both of a harmonic drive and a contactless coupling may be provided in apparatus other than a tractor for converting or transferring movement of a fluid actuated member to another element of a tool or device, such as an electrical generator, a cutting blade or a pump.

BRIEF DESCRIPTION OF THE DRAWINGS

These and other aspects of the present invention will now be described, by way of example, with reference to the accompanying drawings, in which.

DETAILED DESCRIPTION OF THE PREFERRED EMBODIMENT

Figure 1:
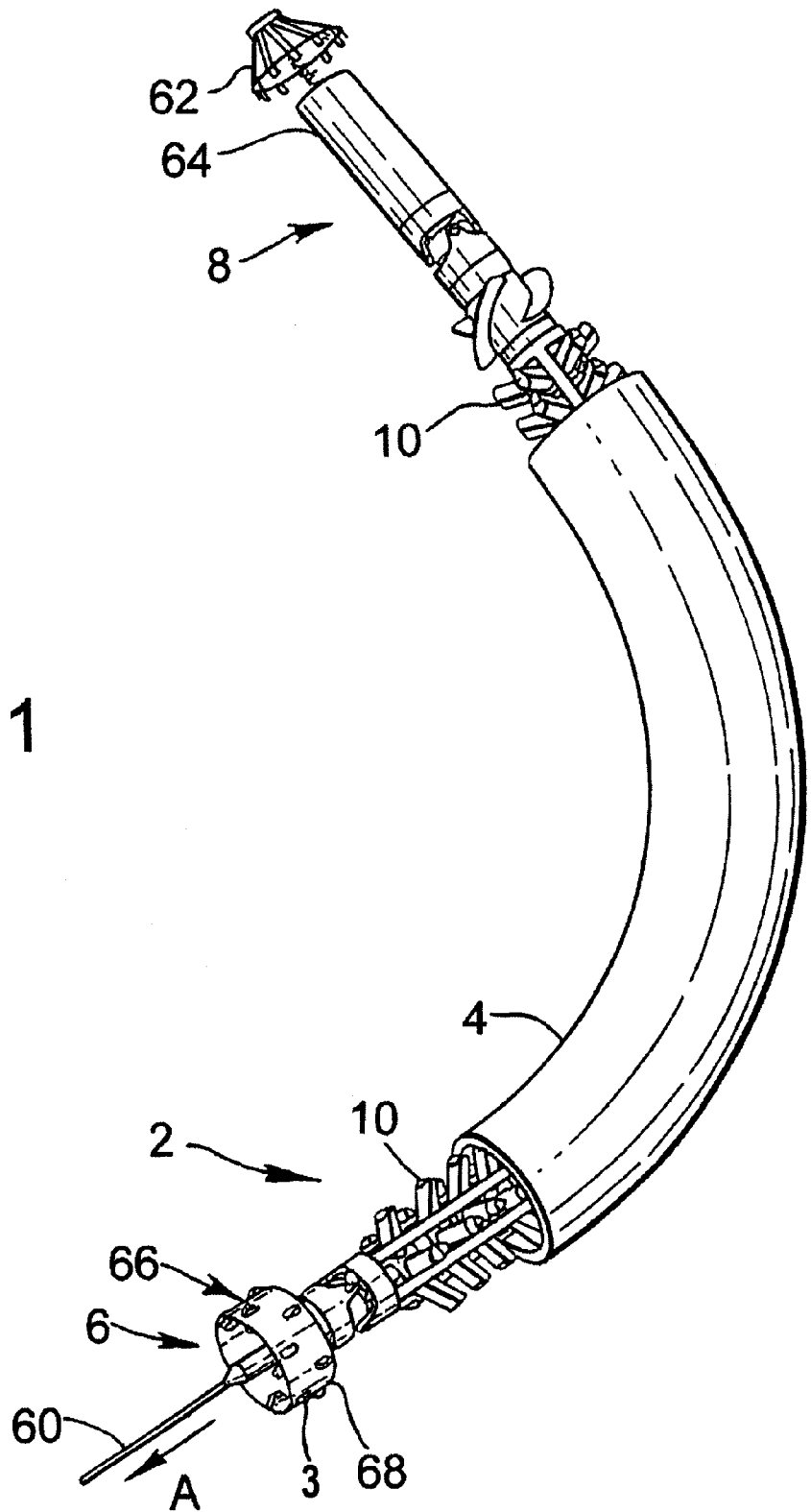
FIG. 1 is a perspective view of a tractor in accordance with a preferred embodiment of the present invention, and shown partially located in a pipe bend.

Reference is first made to FIG. 1 of the drawings, which illustrates a tractor 2 in accordance with a preferred embodiment of the present invention. The tractor 2 is illustrated partially within a pipe bend 4. The tractor 2 comprises an obstruction sensor unit 6 at its leading end, a service module 8 at its trailing end, and a plurality (in this example four) of tractor units 10 (only two visible) coupled together in series. In practice, the number of units 10 provided will depend upon the level of motive force required.

Figure 2:
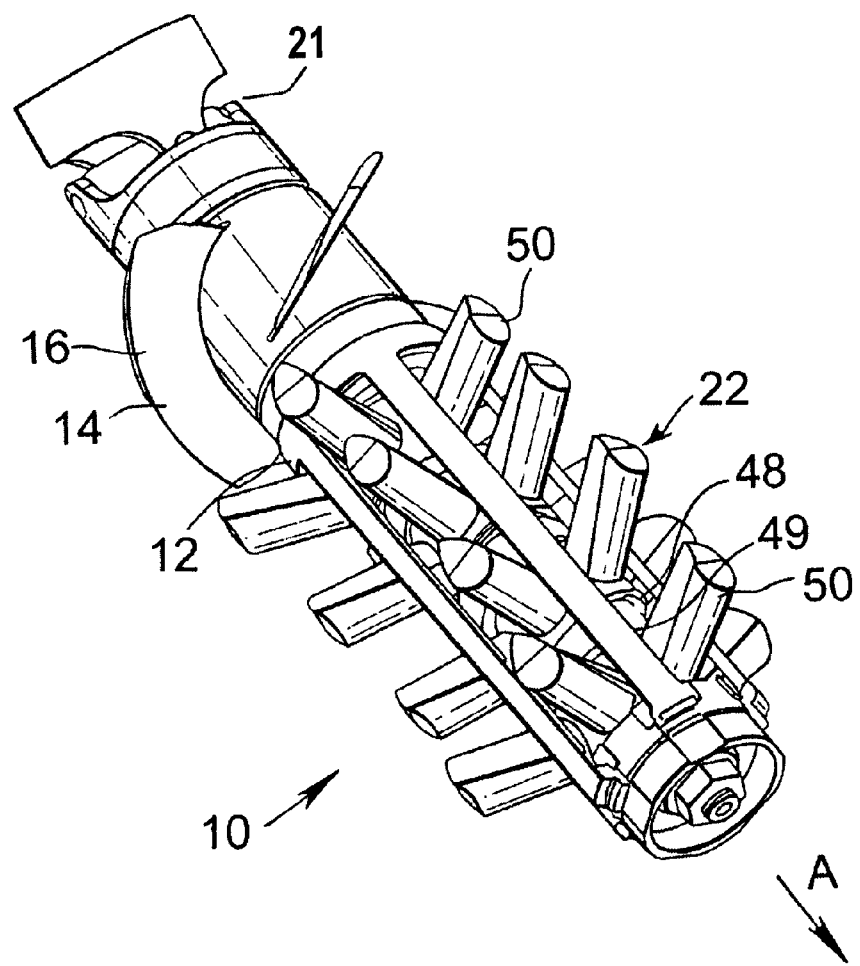
FIG. 2 is a perspective enlarged view of a tractor unit of the tractor of FIG. 1.

Reference is now also made to FIG. 2 of the drawings, which illustrates an individual tractor unit 10 in greater detail. The unit 10 comprises a generally cylindrical housing 12 upon which is mounted a turbine rotor 14 including a number of generally helical blades 16. As will be described, the turbine rotor 14 is linked, via a gearbox 18 (FIG. 3) within the housing 12, to a central drive shaft 20 for driving four brush traction elements 22, such as described in greater detail in U.S. Pat. No. 6,460,616 B1.

Each tractor unit 10 is coupled to the other tractor units via an appropriate universal joint 21. As will be described, and as is evident from FIG. 1, the leading tractor unit is coupled to an obstruction sensor unit 6, while the trailing unit is coupled to a service module 8, both couplings also by univeral joints.

Figure 3:
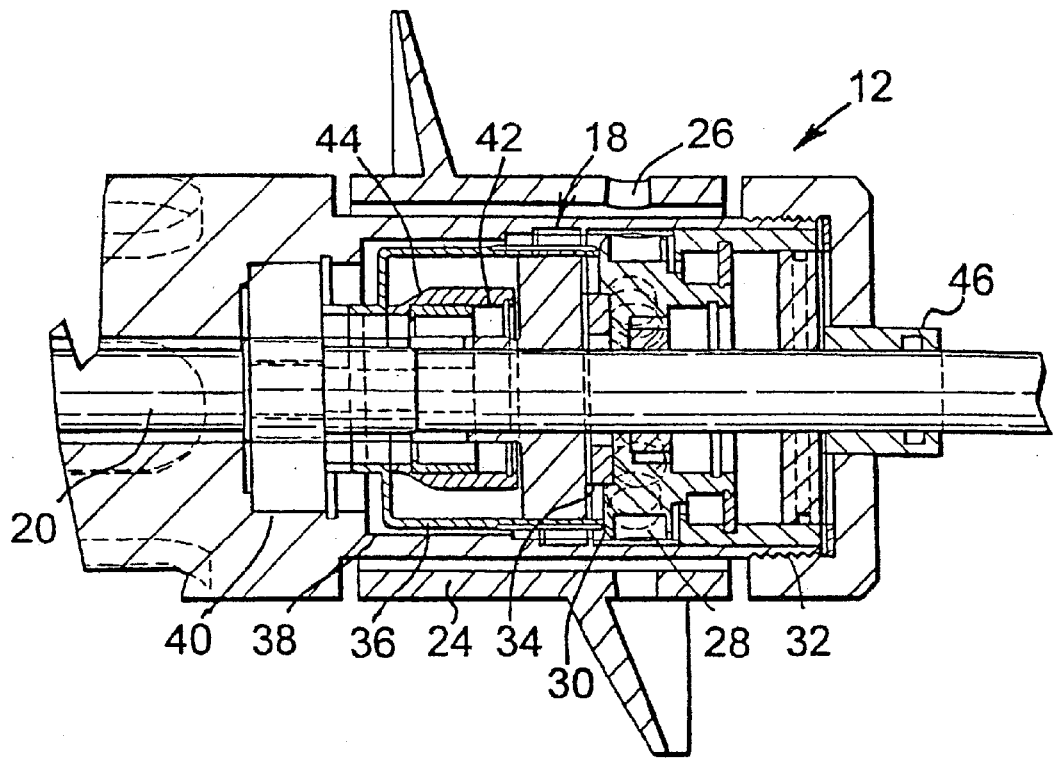
FIG. 3 is an enlarged sectional view of FIG. 2.

Reference is now made also to FIG. 3 of the drawings, which is an enlarged cross-sectional view of the housing 12. The turbine 14 includes a cylindrical sleeve 24 which is mounted on the housing 12 coaxially with the drive shaft 20. The sleeve 24 provides mounting for a number of magnets 26 which interact with opposite pole magnets 28 mounted on a flywheel 30 within the housing 12. The magnets 26, 28 are arranged to provide for inductive coupling through the intervening non-magnetic body portion 32. Thus, the magnets 26, 28 provide a "contactless" coupling and avoid the need to provide seals and the like between the turbine 14 and the housing 12. The flywheel 30 is coupled to the gearbox 18, which is in the form of a harmonic drive, such as supplied by Antriebstechnik GmbH of Limburg/Lahn, Germany. Thus, the flywheel 30 is coupled to an elliptical plug or wave generator 34 about which is mounted a non-rigid, thin cylindrical cup with external teeth, which for brevity will be referred to as a flexispline 36. Mounted externally of the flexispline 36 is a circular spline 38 in the form of a rigid ring defining internal teeth. The wave generator 34 carries a thin race ball bearing. The preferred gearbox 18 provides an 80:1 stepdown, such that if the turbine 14 is rotating at 2000 rpm, this translates to the drive shaft 20 rotating at 25 rpm. Of course, the gearbox 18 is provided with appropriate bearings, in this case these including angular contact bearings 40 and deep groove ball bearings 42 within a bearing housing\gearbox support 44.

As illustrated, the drive shaft extends to the right through a pressure compensated seal 46, but of course the drive shaft 20 may be terminated within this end of the housing 12, when drive or linkage is not required to both sides of the housing 12. The illustrated shaft configuration is utilised to communicate with the obstruction sensor unit 6, and may also be utilised to drive a cutter or the like mounted on the tractor, as will be described later with reference to FIG. 4 of the drawings.

The brush traction elements 22 each comprise a cam 48 mounted on the drive shaft 20 and six elastomer fingers 50 which are oscillated or swashed backwards and forwards by the rotation of the drive shaft 20. As described in U.S. Pat. No. 6,460,616 B1, the cams 48 are offset to vary the traction provided by each traction element 22 such that rotation of the drive shaft 20 will cause the tractor unit 10 to move in direction A through a pipe or conduit contacted by the ends of the fingers 50. The fingers 50 are mounted on the respective cams 48 via bearings 49 and by moving the fingers 50 from one side of the bearing centre line to the other it is possible to reverse the direction of traction, to facilitate movement of the tractor in the opposite direction to the original drive direction.

As noted above, the obstruction sensor unit 6 is mounted on the leading tractor unit, and comprises an elongate probe 60 mounted coaxially with the tractor unit and the drive shaft 20. On the probe 60 encountering a solid obstruction, the probe 60 is pushed rearwardly relative to the leading unit 10. The rearward movement is translated to a corresponding movement of the drive shaft 20 and is relayed through the leading tractor unit 10 to the drive shafts of the other units, and has a number of consequences. Firstly, the axial movement of each tractor unit drive shaft 20 reverses the direction of traction of each traction element 22. Further, the drive shaft movement is also relayed to the service module 8 and triggers the release of a sprung parachute 62, normally contained and restrained in a retracted configuration within the module body 64. Accordingly, the tractor 10 may now be pushed rearwardly by the moving fluid.

This feature of the tractor 2 facilitates retrieval, as the tractor 2 may be deployed into a pipeline at a convenient location and then travels through the pipeline, against the flow of fluid in the pipeline, until encountering a solid obstruction. Rather than driving against the obstruction and perhaps becoming jammed in the pipeline, requiring a complex and expensive retrieval operation, the probe 60 senses the presence of the obstruction and provides for automatic reversal of the tractor 2, which may then be retrieved from the original deployment location.

The probe length may be selected such that the tractor 2 reverses on encountering a bend in the pipeline of a predetermined curvature. For example, it may be desired for the tractor to travel through an oil pipeline from a deployment location to a wellhead, where it is known that the pipeline features a 3D bend. By selecting an appropriate probe length, such a bend may be sensed as a solid obstruction, thus automatically reversing the tractor 2 when it reaches the wellhead.

The obstruction sensor unit 6 further comprises a gauge sensor 66, including a gauge ring 68. The gauge ring 68 is mounted coaxially with the tractor unit 10 and includes rollers to facilitate movement of the ring along the pipe wall. The gauge sensor 66 operates in a similar manner to the probe 60, that is on encountering a gauge restriction the ring 68 is pushed rearwardly relative to the advancing tractor unit 10, and this movement is translated to movement of the drive shaft 20, with similar consequences to corresponding movement of the probe 60.

The service module 8, in addition to containing the parachute 62, accommodates various sensors to, for example, sense pipeline condition to allow early detection of corrosion, erosion or other pipeline damage or flaws, or to detect pressure, temperature or other parameters. Other apparatus, including signal transmitters and receiver to permit remote monitoring or control of the tractor, may also be provided within the module 8. The module 8 may be powered by battery or the like, or may draw power from a generator powered by a tractor unit turbine. In other embodiments, the module 8 may feature a dedicated turbine.

Figure 4:
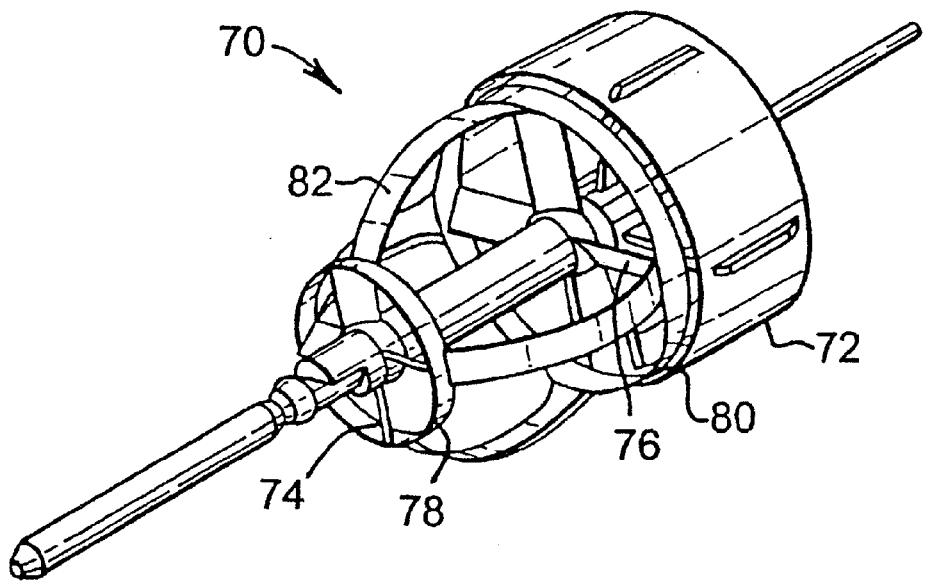
FIG. 4 is a perspective view of a cutting blade arrangement for use with a tractor in accordance with an embodiment of the present invention.

Reference is now made to FIG. 4 of the drawings, which illustrates a cutter arrangement 70, which may be mounted to the tractor 2 for use in pipeline cleaning operations. The cutter 70 is adapted to be mounted on the leading tractor unit 10 and driven by a forward extension of the drive shaft 20, as illustrated in FIG. 3, via gearing to provide an appropriate rotational speed. The cutter 70 is located forward of a gauge ring 72 and features two sets of radially extending cutting blades 74, 76 mounted within respective rings 78, 80, and a set of axially and radially extending blades 82 extending between the blade sets 74, 76.

In use, the cutter 70 will be rotated and advance through the pipeline with the tractor to dislodge and break up wax and other deposits which have gathered in the pipeline, the deposits then being washed past the tractor 2 by the flowing fluid, in the opposite direction to the tractor motion. This is in contrast to conventional pipeline cleaning pigs, which are pushed in the same direction as the flowing fluid, and thus push the dislodged material in front of the pigs, leading to a build up of material which may ultimately halt the progress of the pig.

The cutter 70 may serve a similar function to the probe 60 and gauge ring 68 described above, in that on encountering an obstacle which is not removed by the cutter 70, the cutter 70 is forced backwards relative to the tractor unit 10, and reverses the tractor 2. Alternatively, or in addition, the cutter 70 may be arranged such that, on encountering a heavy deposit, which tends to slow the cutter speed, a governor on the cutter drive shaft urges the drive shaft 20 and the flywheel 30 rearwardly, introducing a degree of misalignment between the magnets 26, 28, and thus reducing the degree of coupling between the turbine 14 and the drive shaft 20. This slows the rate of advance of the tractor 2, such that the cutter 70 also advances more slowly, and has the opportunity to clear the deposit. Alternatively, or in addition, the degree of coupling may remain unchanged but the drive shaft 20 may be moved axially to vary the relative positioning of the brush traction elements 22, to slow the rate of advance; this arrangement offers the advantage that the power input to the cutter 70 does not decrease. In other embodiments, the cutter 70 may be also be driven by a dedicated cutter turbine.

It will be apparent to those of skill in the art that the above described embodiments of the present invention provide a tractor arrangement with the ability to travel, without requiring an external power supply, through a pipeline or other conduit or bore, with or against fluid flow in the pipeline. The ability to reverse the traction of the preferred drive arrangement also facilitates retrieval of the tractor, permitting launch and retrieval of the tractor from the same point. The provision in the preferred embodiment of the magnetic coupling between the turbine and the gearbox, and the use of a harmonic drive gearbox, provide a compact and contactless coupling between the turbine and the traction elements, and permit the turbine 14 to be mounted concentrically about the drive shaft 20.

It will be further apparent those of skill in the art that the above described embodiments are merely exemplary of the present invention, and that various modifications and improvements may be made thereto, without departing from the present invention.

What is claimed is:

1. A tractor adapted for travel through a moving fluid stream, the tractor comprising:
   at least one body;
   drive means for moving the at least one body in a desired direction;
   a member mounted on the at least one body and adapted to be driven by moving fluid; and
   conversion means for converting movement of the member to drive for the drive means.

2. The tractor of claim 1, wherein the member is adapted to be rotated by flow of fluid past the at least one body.

3. The tractor of claim 1, wherein the member is a turbine blade.

4. The tractor of claim 1, wherein the member is rotatable around the at least one body.

5. The tractor of claim 4, wherein the member has an axis of rotation coaxial with the at least one body.

6. The tractor of claim 1, wherein the conversion means couples the member and the drive means and is adjustable to vary the degree of coupling between the member and the drive means.

7. The tractor of claim 1, wherein the conversion means comprises a contactless coupling.

8. The tractor of claim 1, wherein the conversion means comprises a magnetic coupling.

9. The tractor of claim 8, wherein the conversion means comprises a magnetic induction coupling.

10. The tractor of claim 9, wherein the spacing between driving and driven elements of the coupling is variable, to vary the degree of coupling between the elements.

11. The tractor of claim 10, wherein the driving and driven elements are relatively axially movable.

12. The tractor of claim 1, further including cutting means for removing or dislodging material surrounding or adjacent the at least one body.

13. The tractor of claim 12, wherein the cutting means comprises a blade.

14. The tractor of claim 1, wherein the conversion means is operatively associated with a coupling control to control the degree of coupling between driving and driven elements of the coupling.

15. The tractor of claim 14, wherein the coupling control comprises a driven rotating blade, a reduction in blade speed reducing the degree of coupling, to slow the rate of advance of the tractor.

16. The tractor of claim 1, wherein the conversion means comprises reduction gearing for converting a high speed low torque input from the member to a relatively low speed high torque output to the drive means.

17. The tractor of claim 1, wherein the conversion means comprises an output shaft which is substantially coaxial with an axis of rotation of the member.

18. The tractor of claim 1, wherein the conversion means comprises a harmonic drive.

19. The tractor of claim 1, wherein the drive means is in the form of a plurality of brush traction elements.

20. The tractor of claim 19, wherein the brush traction elements comprise sprung traction fingers bearing mounted on cams mounted on a central drive shaft and the traction elements are swashed backwards and forwards by rotation of the shaft.

21. The tractor of claim 20, wherein the mounting positions of the brush traction elements are movable from one side of a respective bearing centre line to the other to reverse the direction of traction.

22. The tractor of claim 1, further comprising a selectively actuatable fluid flow restriction adapted to interact with a flowing fluid to create a force on the tractor.

23. The tractor of claim 22, wherein the restriction is in the form of a parachute.

24. The tractor of claim 1, wherein the tractor comprises a plurality of bodies, each body provided with drive means, a member, and conversion means.

25. The tractor of claim 24, wherein the bodies are coupled by universal joints.

26. The tractor of claim 24, wherein the bodies are coupled by constant velocity universal joints.

27. The tractor of claim 1, wherein the tractor includes an obstruction sensor operatively associated with at least one of the conversion means and the drive means for at least one of reversing and uncoupling said one of the conversion means and the drive means to permit the tractor to move in an opposite direction.

28. The tractor of claim 27, wherein the sensor is operatively associated with a selectively actuatable fluid flow restriction adapted to interact with a flowing fluid to create a force on the tractor.

29. The tractor of claim 27, wherein the sensor comprises an elongate probe at a leading end of the tractor.

30. The tractor of claim 27, wherein the sensor comprises a gauge ring.

31. The tractor of claim 27, wherein the sensor comprises a cutting blade.

32. A method of moving a tractor through a moving fluid stream, the method comprising:

locating a tractor in a moving fluid stream such that a member on the tractor body is moved by the fluid; and converting the movement of the member to a drive force to drive the tractor in a desired direction.

33. The method of claim 32, further comprising locating the tractor in a bore containing a moving fluid stream.

34. The method of claim 33, further comprising driving the tractor in the opposite direction to the moving fluid stream.

35. The method of claim 33, further comprising converting said movement of the member to an action for removing or dislodging material surrounding or adjacent the body in the bore.

36. The method of claim 32, further comprising:

reconfiguring the tractor to permit the tractor to be driven in an opposite direction in the fluid stream.

37. The method of claim 36, further comprising reconfiguring the tractor to create a fluid flow restriction adapted to interact with the fluid stream to create a force on the tractor.

38. The method of claim 32, further comprising sensing an obstruction in the path of the tractor and then reconfiguring the tractor to permit the tractor to be driven in the opposite direction in the fluid stream.

39. The method of claim 38, wherein the obstruction is a predetermined deviation in the path of the tractor.

40. A tractor adapted for travel through a moving fluid stream, the tractor comprising:

a body;

drive means for moving the body in a desired direction;

a rotatable member mounted on the body and adapted to be driven by moving fluid; and conversion means for converting rotation of the member to drive for the drive means, said conversion means comprising a harmonic drive.

41. The tractor of claim 40, wherein the conversion means further comprises a contactless coupling between the rotatable member and the drive means.

42. A tractor adapted for travel through a moving fluid stream, the tractor comprising:

a body;

drive means for moving the body in a desired direction;

a rotatable member mounted on the body and adapted to be driven by moving fluid; and conversion means for converting rotation of the member to drive for the drive means, said conversion means comprising a contactless coupling between the rotatable member and the drive means.

43. The tractor of claim 42, wherein the conversion means further comprises a harmonic drive.

44. A tractor adapted for travel through a moving fluid stream, the tractor comprising:

at least one body;

a drive member for moving the at least one body in a desired direction;

a member mounted on the at least one body and adapted to be driven by moving fluid; and conversion apparatus for converting movement of the member to drive the drive member.

* * * * *